Jan. 4, 1955 G. G. SINGER 2,698,716
CALCULATOR
Filed Sept. 3, 1953 2 Sheets-Sheet 1
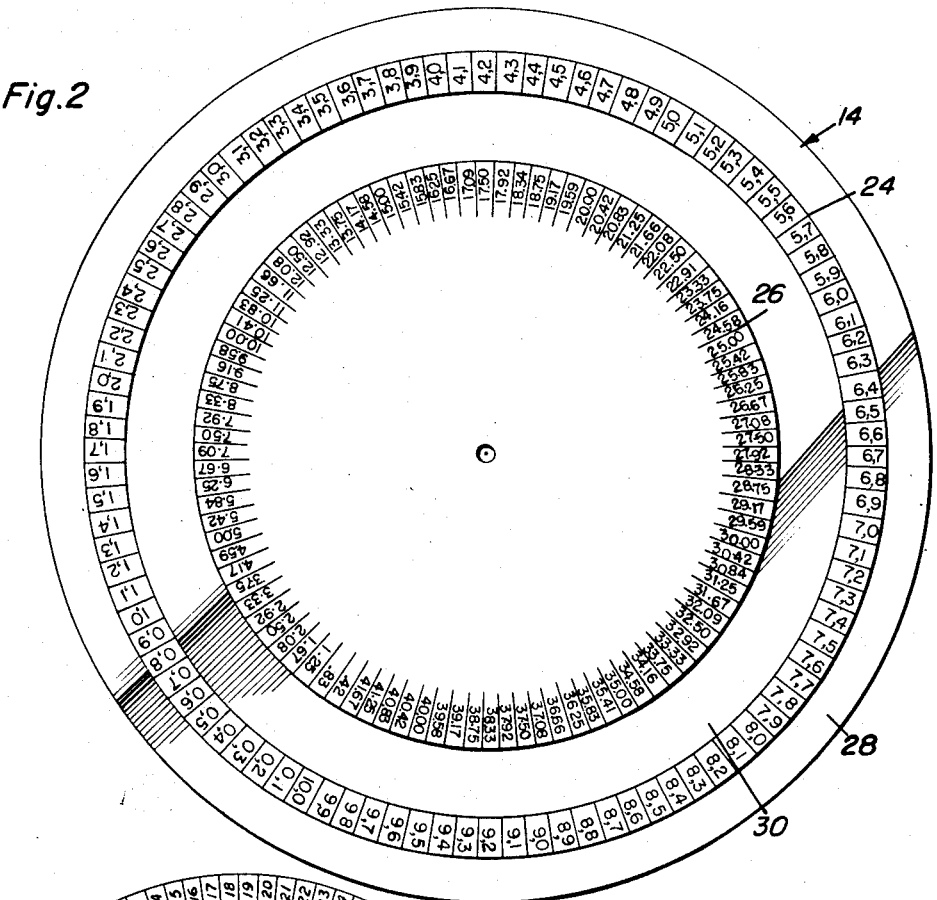
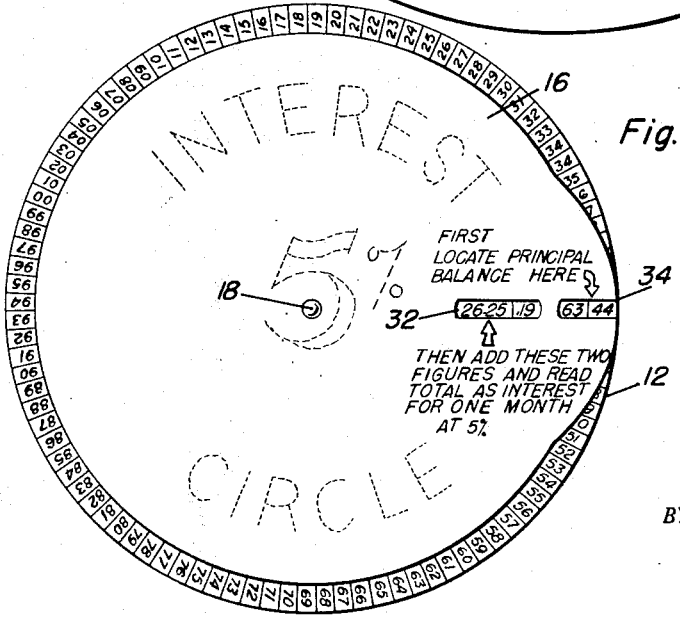
Gordon G. Singer
INVENTOR.
BY *Clarence A. O'Brien
and Harvey B. Jacobson*
Attorneys Jan. 4, 1955

G. G. SINGER 2,698,716

CALCULATOR

Filed Sept. 3, 1953

Gordon G. Singer
INVENTOR.

United States Patent Office 2,698,716
Patented Jan. 4, 1955

2,698,716

CALCULATOR

Gordon G. Singer, Allentown, Pa.

Application September 3, 1953, Serial No. 378,391

4 Claims. (Cl. 235—88)

This invention relates to a calculator and more specifically provides a calculator for computing the interest on variable principals thereby to quickly and accurately determine the amount of interest on any given loan for a given period of time and interest rate.

An object of this invention is to provide a calculator which may be used wherein the problem involved has a single variable.

Another object of this invention is to provide a calculator wherein the increments of the variable is divided into relatively small portions.

A further object of this invention is to provide a circular calculator having an indicator plate with openings therein for reading the variable such as the principal on a loan and also reading the answer to the problem such as the amount of interest on the principal.

Yet another object of this invention is to provide a calculator which is simple in construction, easy in operation, inexpensive to manufacture, and well adapted for the purposes intended.

These together with other objects and advantages which will become subsequently apparent reside in the details of construction and operation as more fully hereinafter described and claimed, reference being had to the accompanying drawings forming a part hereof wherein like numerals refer to like parts throughout, and in which:

Figure 1 is a top plan view of the calculator of this invention showing details of the indicator plate;

Figure 2 is a top plan view showing details of the indicia on the intermediate plate;

Figure 3:
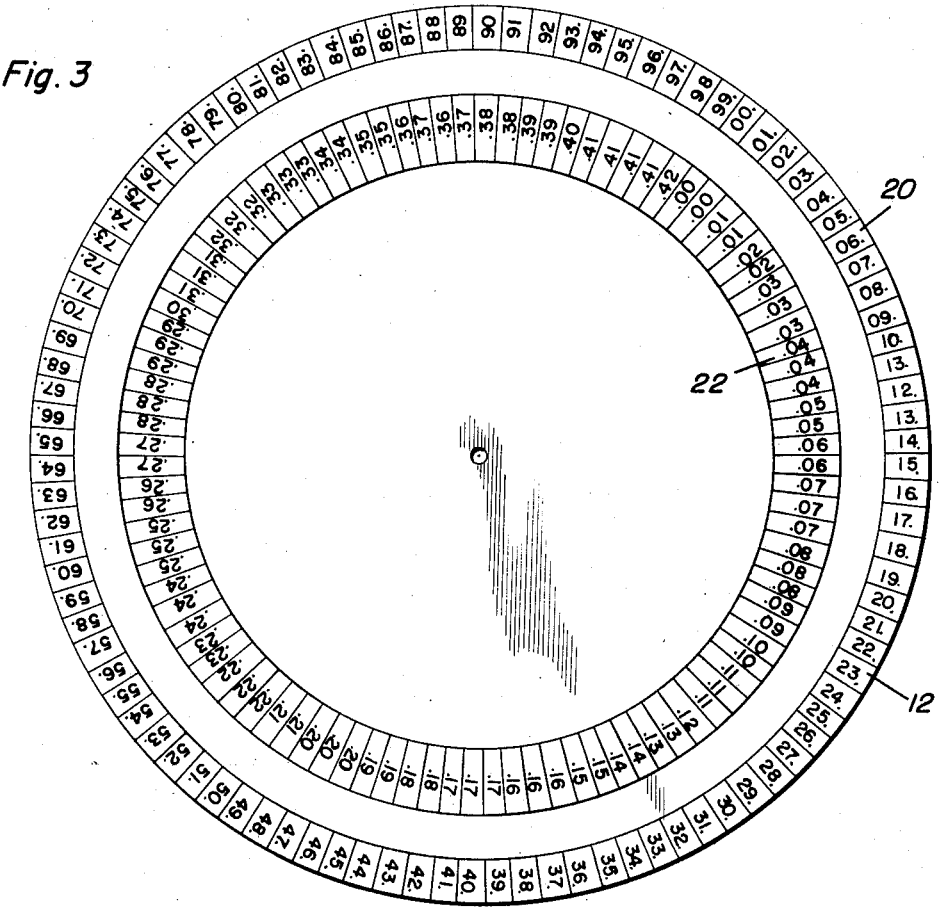
Figure 3 is a top plan view of the base plate and showing the arrangement of the indicia thereon.
Figure 4:
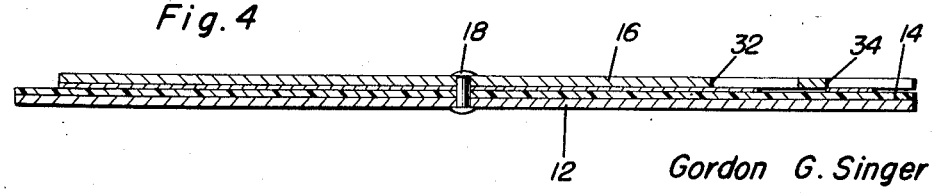
Figure 4 is a transverse, vertical section taken substantially along a diameter of the calculator of this invention showing the relationship of the rows of indicia and the window openings in the indicator plate.

Referring now more specifically to the drawings, it will be seen that the numeral 10 generally designates the calculator of this invention having a base plate 12 and intermediate plate 14 and a top or indicator plate 16 rotatably secured together at their center by a suitable rivet 18 forming an axis therefor.

Now referring specifically to Figure 3 it will be seen that the base plate 12 has an annular row of indicia 20 about its peripheral edge with the indicia thereon running from 1–100 with a space thereon for each number. A second row of indicia 22 is concentric with the first row of indicia 20 and spaced radially inwardly therefrom and having the same number of spaces and the numerals thereon represent the interest amount on the numbers on the outer row 20. In this specific embodiment the numerals on the outer row 20 represent the principal amounts from $1.00 to $99.00 and the interest amounts indicated on the inner row 22 is that amount when the rate is 5 percent and the time is one month. Now referring specifically to Figure 2 it will be seen that the intermediate plate 14 has an outer annular row of indicia 24 spaced inwardly from the peripheral edge of the plate 14 and a second row of indicia 26 concentric with and spaced inwardly from the outer row 24. In this specific embodiment the outer row represents the principal amounts from $100 to $9,900 and the numerals in the inner row represents the interest on these principal amounts at the rate of 5 percent and the time of one month. The spaces on the row 24 and the row 26 are in alignment and the full circle is divided into one hundred spaces. The intermediate plate 14 is the same size as the base plate 12 and the plate 14 is provided with annular transparent portions 28 and 30 with one of the transparent portions extending around the periphery of the plate 14 and overlying the row of indicia 20 on the base plate 12 and the second transparent portion 30 is disposed between the rows 24 and 26 on the plate 14 and overlie the row of indicia 22 on the base plate 12. The remainder of the intermediate plate 14 may be composed of suitable material for applying the numerals thereto. Now referring specifically to Figure 1, it will be seen that the indicator plate 16 is provided with a pair of window slots 32 and 34 in alignment and radially spaced from each other. The outermost slot 34 is an open ended slot and the innermost slot 32 is a closed slot and the lower edges of the slots form a guide line. The indicator plate 16 is generally smaller in diameter than the plates 14 and 12 thereby giving a constant view to the row of numerals 20 and adjacent the slots 32 and 34 the circumference of the indicator plate 16 is projected outwardly in a bulged manner. The bulged portion of the indicator plate 16 has a circumference which is coincident with the circumference of the plates 12 and 14 and the outermost slot 34 is open ended with the open end thereof being coincident with the circumference of the circular plates 12 and 14. It will be noted that the bulged portion of the indicator plate 16 completely covers all of the indicia thereby affording a distinguishing flat surface adjacent the window slots thereby affording easier viewing of the indicia.

The operation of the device will be readily understood. The base plate 12, the intermediate plate 14, and the indicator plate 16 may be rotated relative to each other to bring the desired principal amount in view under the open slot 34. The amount of the principal is determined by manipulation of the base plate 12 and the intermediate plate 14 and aligning appropriate numerals in the rows 20 and 24 of indicia wherein a principal amount ranging from $1.00 to $99.00 is set on the indicia row 20 and the amount from $100 to $10,000 is set on the indicia row 24 thereby giving a range of $1.00 to $10,000 in multiples of $1.00. This range of flexibility is highly desirable in the loan business. After the principal amount is set under the open slot 34 the inner slot 32 has thereunder two separate sets of numerals with the inner set being the numerals in the row 26 and the outer set being the numerals in row 22 and these two numerals are then added together for computing the amount of interest on the principal which is shown under the open ended slot 34. This specific embodiment is set up with an interest rate of 5 percent and time of one month and the example as shown in Figure 1 has a principal amount of $6,344 and it will be seen that the interest charge for one month at 5 percent will be $26.25 plus $.19 or $26.44. The calculator of this invention is specifically designed to give a reading on 10,000 different principal amounts and naturally 10,000 different interest charges.

Obviously, the calculator may be used in conjunction with other rates of interest and other increments of time as desired and it is recommended that different calculators be provided in the place of business with the different calculators having various interest rates and time increments thereon. With a full set of these calculators a person may easily and quickly compute the interest charge on a loan for a certain amount of time. It will appear that other uses may be made of the principles of operation of this calculator wherein it is desired to find an answer when the variable may be the cost of a gallon of fuel or any other variable such as gallons delivered or amount purchased or wherever a total quantity is desired when a known rate is given and the variable can be measured.

The calculator of this invention may be made of suitable carboard, plastic, or other sheet material which is cheap and sturdy in construction.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A calculator comprising a circular base plate, a circular intermediate plate overlying said base plate, and an indicator plate overlying said intermediate plate, said plates being rotatably journalled together by a pivot pin passing through their centers, said base plate having spaced annular rows of indicia with the outer of said rows adjacent the peripheral edge of said plate, said intermediate plate having spaced annular rows of indicia thereon with the outer row of indicia being positioned between the spaced rows of indicia on the base plate, said indicator plate having a pair of adjacent aligned windows for viewing all four rows of indicia with each of said windows providing a view of one row of indicia on the intermediate plate and one row on the base plate respectively.

2. The structure as defined in claim 1 wherein said base plate and intermediate plate are the same size and the annular portions of said intermediate plate overlying the rows of indicia on said base plate are transparent.

3. The structure as defined in claim 1 wherein said indicating plate covers the inner row of indicia of the base plate and both rows on the intermediate plate and a projecting portion on the circumference of said plate with the outer viewing window partially disposed in said projecting portion.

4. The structure as defined in claim 1 wherein the two rows of indicia as viewed through the outer window are read as a single number and the two rows of indicia as viewed through the inner window are added together and then read as a single number.

No references cited.